April 12, 1949.

W. L. MacKENZIE 2,466,818

MACHINE FOR COATING PLATFORM
SHOES AND COVERS THEREFOR

Filed Jan. 27, 1947

Inventor
Wilbur L. MacKenzie
By his Attorney

April 12, 1949.

W. L. MacKENZIE 2,466,818

MACHINE FOR COATING PLATFORM
SHOES AND COVERS THEREFOR

Filed Jan. 27, 1947

Inventor
Wilbur L. MacKenzie
By his Attorney

Inventor
Wilbur L. MacKenzie
By his Attorney

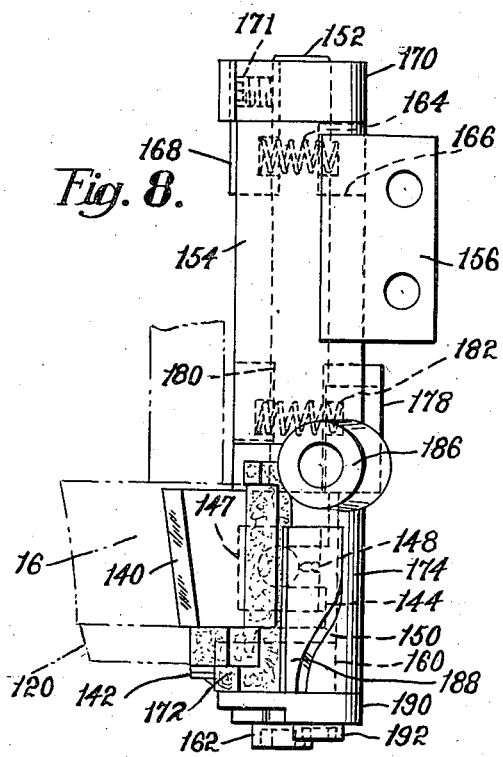
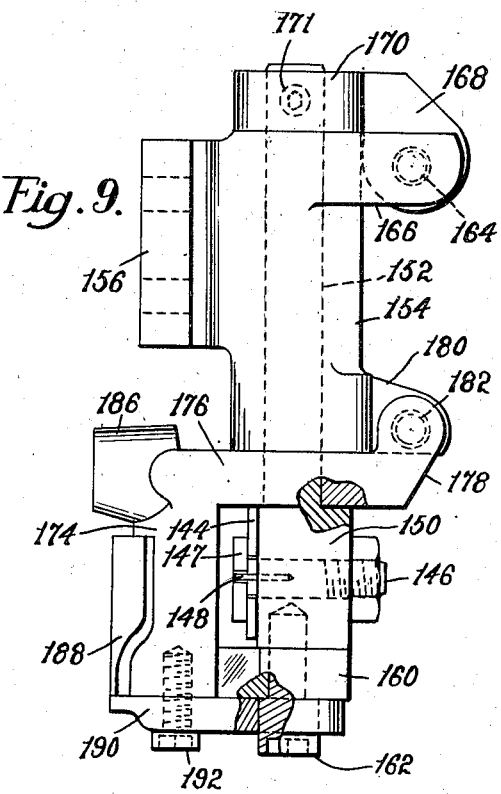
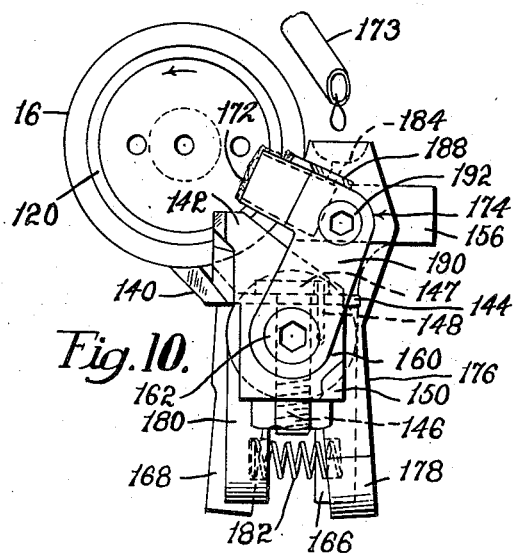
Inventor
Wilbur L. MacKenzie
By his Attorney

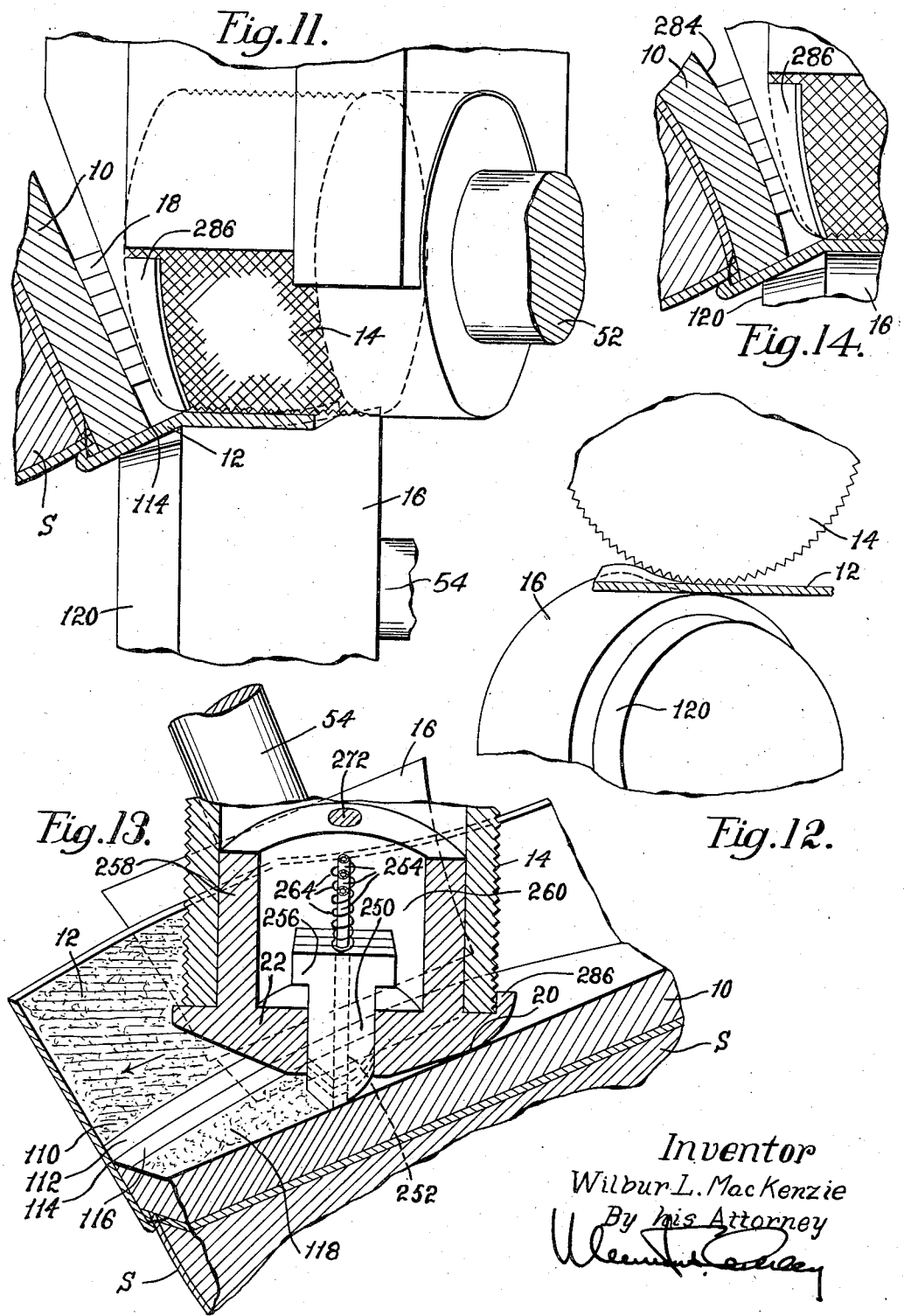

Patented Apr. 12, 1949

2,466,818

UNITED STATES PATENT OFFICE 2,466,818

MACHINE FOR COATING PLATFORM SHOES AND COVERS THEREFOR

Wilbur L. MacKenzie, Beverly, Mass., assignor to United Shoe Machinery Corporation, Flemington, N. J., a corporation of New Jersey Application January 27, 1947, Serial No. 724,559

17 Claims. (Cl. 12—1)

This invention relates to machines for simultaneously applying coatings of cement or cement activator to the margins of platform soles and to the covers, carried by the shoes, which are subsequently wrapped or lasted over the edge portions of the soles and adhesively secured to their margins. An object of the invention is to provide an improved machine of this type which will stretch the cover as it coats it and in the operation of which the continuity of the band of cement simultaneously applied to the sole does not depend upon an exact positioning of the sole with respect to the coating device.

It is well understood that, in the application of coatings to the flexible covers surrounding the edge of the platform sole on a shoe, these covers must be tensioned or stretched because of the very flimsy nature of the material often employed, and because of the desirability of locating the applied band with such exactitude with respect to the corner of the platform sole that there shall be no sticking of the cover to the sole prior to lasting. In order to accomplish this in a machine which simultaneously coats both the cover and the sole, the bottom of which may be flat in the forepart and curved in the shank portion, it is desirable to utilize a conformable coating device which will not require the exact positioning of the sole in any particular plane as the shoe is held with the bottom of the sole toward the end of the machine and is turned to present successive portions of the cover.

A feature of the invention, therefore, resides in a novel combined machine having means for stretching the cover by reason of a cross-feed action with respect to cover-gripping rolls. Preferably, and as shown, the machine will include a yieldable nozzle for coating the sole.

The cross-feed action with respect to the coating roll may be set up by providing an abutment or a rest adjacent to the end of the coating roll against which the bottom of the platform sole is raised, to guide the shoe diagonally with respect to the axis of the applying roll. It will be understood that the cover is gripped against the applying roll at this time by a supporting roll and commonly both rolls are driven. Accordingly, still another feature of the invention resides in a combined cover and sole coating machine in which the coating of the sole is effected by a yieldable nozzle built into the guide rest which is positioned at the end of the coating roll for the cover.

Other features of the invention reside in the employment of a hollow roll for receiving a nozzle contained in a projection on the adjacent guide. Preferably the nozzle embodied in that projection comprises a series of yieldably mounted fingers which are held outwardly by springs and in the illustrative construction a novel arrangement is provided for supplying solvent to the portions of the nozzle fingers with which the springs are associated.

Still another feature of the invention lies in a placement of the coacting supporting roll so that the end of this roll is in a vertical plane substantially parallel to the plane of the bottom of the shoe as it is guided by the bottom rest. To this end the periphery of the supporting roll has a shallow groove to closely grip the cover against the periphery of the coating roll. The outer corner of the supporting roll is cut away to facilitate the guiding without interference of the approaching sole with the near corner of the supporting roll.

These and other features of the invention can best be understood from a consideration of the following description taken in connection with the accompanying drawings in which:

Fig. 3a is an enlarged view of a supporting flange on an upper portion of the column;

Fig. 3b is a horizontal section on the line IIIb—IIIb of Fig. 3;

Figs. 8, 9 and 10 are views in plan, in side elevation and in end elevation of the scrapers which cooperate with the work-supporting roll;

Fig. 11 is a view in elevation on the scale of Fig. 6 to show a platform cover gripped between the applying roll and the supporting roll and with a platform sole engaging the nozzle. This view is taken in a plane parallel to the axis of the supporting roll;

Fig. 12 is a diagrammatic view on the same scale showing in elevation fragments of the applying roll and the supporting roll;

Fig. 13 is a horizontal section taken on the axis of the applying roll and showing a piece of work in position; and Fig. 14 is a fragmentary vertical section like Fig. 11 but with the shank portion of the sole in engagement with the nozzle.

Figure 1:
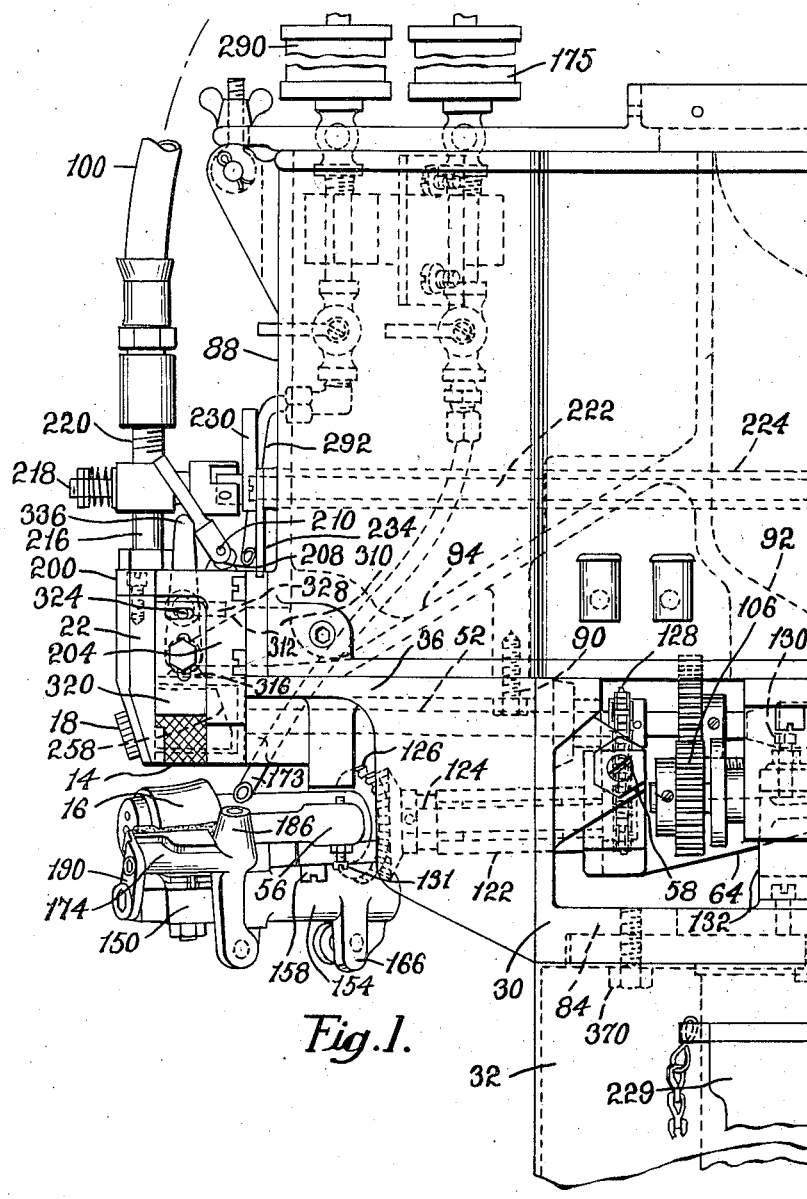
Figs. 1 and 2 are views in elevation of adjacent portions of the head of the machine showing the work-engaging members and the receptacles from which cement is supplied to an applying roll and a nozzle respectively.

As a shoe S having a platform sole 10 (Fig. 11) and a platform cover 12 is presented to the machine, the cover is gripped between a hollow applying roll 14 and a supporting roll 16 and is positioned with the platform sole 10 in engagement with the tips of nozzle fingers 18. The sole will also be positioned to engage an abutment or guide surface 20 (Fig. 13) in a nozzle carrier 22.

Figure 2:
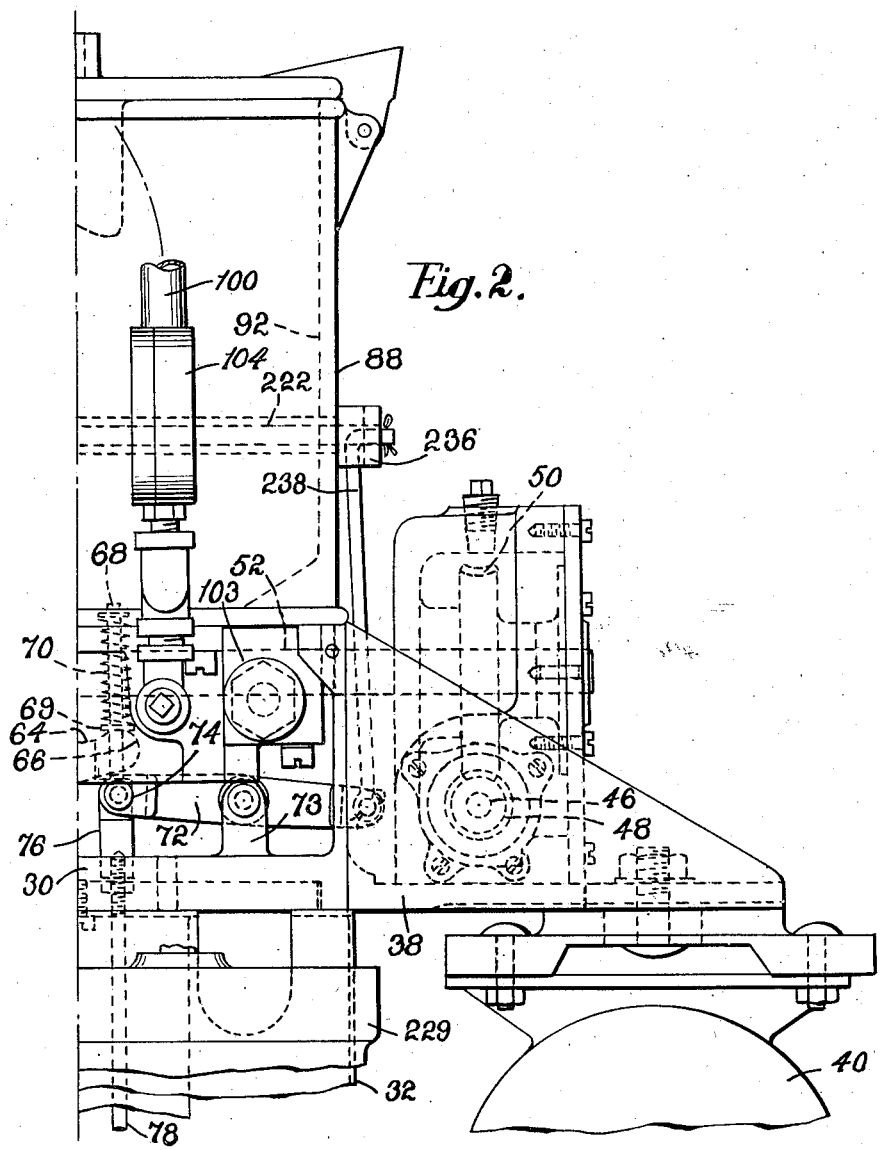
Figure 3:
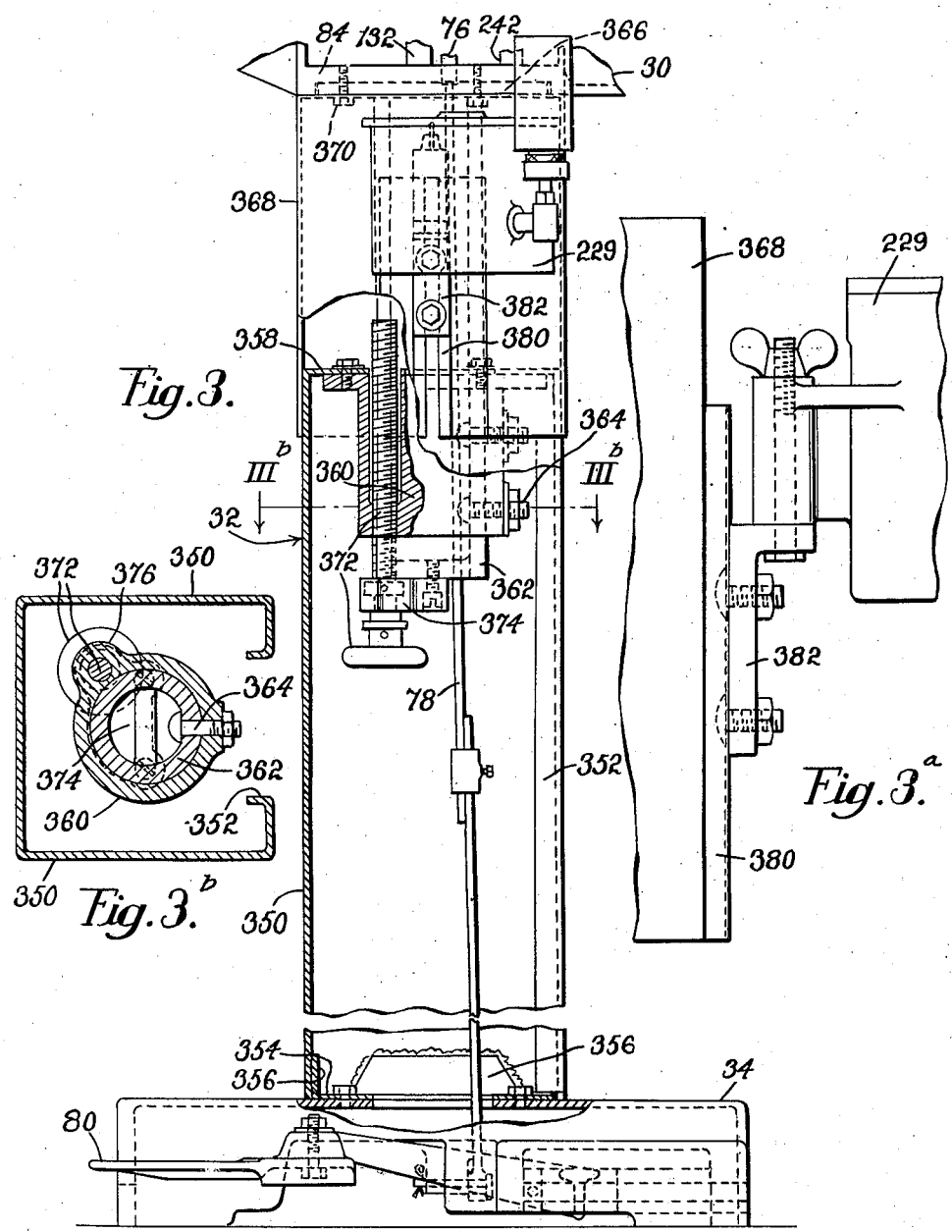
Fig. 3 is a side elevation of the column on which the head of the machine is supported.

These work-engaging parts are supported by a frame 30 (Figs. 1, 2 and 4) carried at the upper end of an adjustable column 32, which is mounted on a box-like base 34 (Fig. 3). The principal or lower portion of the column 32 is a box-like column 350 having three closed sides and inturned vertical flanges 352 (Fig. 3b) on the fourth side. The lower end of this box-like column 350 is provided with an end plate 354 (Fig. 3) having flanges 356 welded to the three sides of the column. The lower end plate 354 is then bolted to the box-like cast-iron base 34. At its upper end the box-like column has an inturned flange 358 to which there is bolted a bearing sleeve 360. This bearing sleeve slidably receives a post 362 having a vertical slot to receive the shanks of clamping bolts 364 by means of which the post may be adjustably secured with respect to the sleeve. The upper end of the post carries a horizontal plate 366 to which there is secured a depending sheet metal housing 368 telescoping over the rectangular box-like column in any position of adjustment of the height of the column. This housing is held on the plate 366 by bolts 370 which also are threaded in a bottom flange 84 of the frame 30. It will be seen that, by access through the open side of the box-like column, adjustment of the height of the column may be provided by loosening the clamping bolts 364 and turning a hand screw 372 rotatable in, but held against axial movement with respect to a block 374 attached to the lower end of the post 362, this screw being threaded in a boss 376 on the side of the bearing sleeve 360. On the housing 368 which forms the upper part of the column are welded two flanged or zig-zag strips 380 to which there is clamped a bracket 382 having an upright pintle which carries and serves as a hinge for a solvent container 229.

Figure 4:
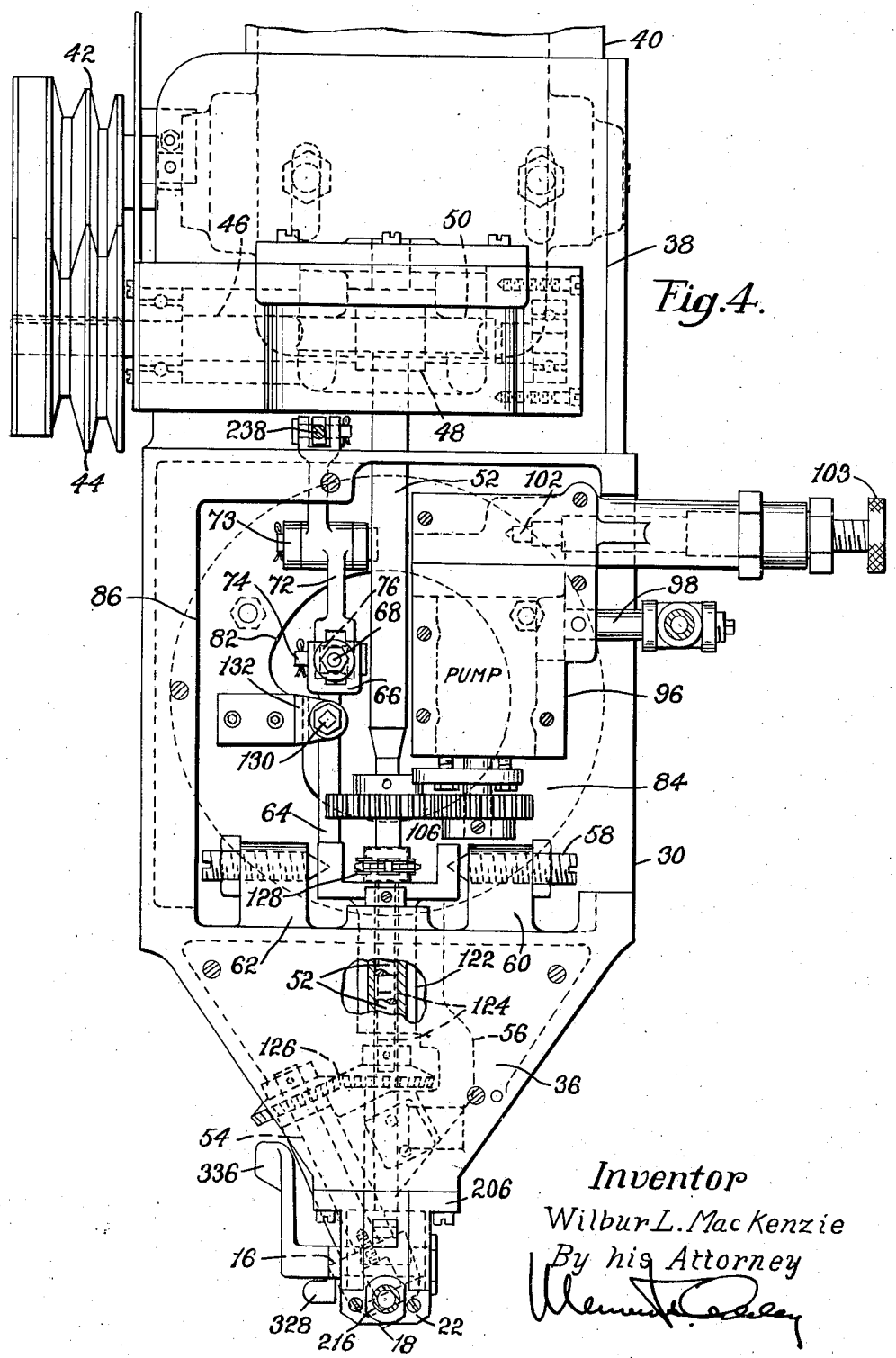
Fig. 4 is a plan view of a frame mounted on the column and supporting the receptacles and containing the driving mechanism.

From Fig. 4 it will be seen that the frame 30 comprises a rectangular midportion, a substantially triangular extension 36 seen also at the left of Fig. 1 and a supporting bracket 38 seen also at the right of Fig. 2. On this bracket 38 there is carried a driving motor 40 having a pulley 42 belt connected to another pulley 44 which is on the rear end of a jack shaft 46 which has a worm 48 engaging a worm gear 50. This latter is mounted on the end of a drive shaft 52 which is supported in journals provided in the rectangular frame and on the left-hand end of which is mounted the applying roll 14. The work-supporting roll 16 is carried on a jack shaft 54 which is journaled in a tilting bracket 56 forked inside the hollow frame and pivoted between conical screws 58 which are threaded in lugs 60, 62 forming part of the frame. The bracket has an extension 64 the end of which is forked at 66 to surround a treadle-rod extension 68 and to underlie a washer 69 (Fig. 2) held resiliently against the forked end 66 by a spring 70 between this washer and the head of the treadle-rod extension. The lower end of the extension 68 is connected to a tilting lever 72 by means of a transverse pin 74. This lever 72 is pivoted in brackets 73 extending up from a bottom flange 84 of the frame 30. To the pin 74 there is also secured the forked upper end 76 of a treadle rod 78, the lower end of which is pivotally connected to a treadle 80 swung on a horizontal pivot on the base 34 (Fig. 3). This treadle rod passes through a generally circular opening 82 (Fig. 4) in a flange 84 at the bottom of the hollow frame 30 and this flange is utilized for attaching the frame to the top of the column.

At the top of the frame there is another flange 86 by which, and a cover portion on the triangular extension 36, there is mounted on the top of the frame a double receptacle 88 held in position by screws such as that shown at 90 in Fig. 1. This receptacle is provided with a container 92 for cement to be delivered to the nozzle 18 and another receptacle 94 for cement to be delivered to the applying roll 14. Inside the frame there is a gear pump 96 which receives cement from the receptacle 92 and delivers it through an outlet 98 which is connected, as will later appear, to the nozzle 18 by means of a flexible hose 100. A by-pass controlled by a needle valve 102 having a head 103 is used to regulate the pressure of the cement delivered to the nozzle as indicated by a dial gage 104. The pump is driven by meshing gears 106 connecting the pump shaft to the drive shaft 52.

It is desired to have the work move in a direction indicated by the arrow in Fig. 13 in order that a cross-feed action may be set up by the applying roll and the supporting roll which will constantly tend to tension the platform cover 12 away from the sole 10. This direction is determined by the guide surface 20 and the tensioning of the cover results from the fact that the work is always moving at an acute angle to the axis of the applying roll 14 so that the surface of the latter tends to carry the cover both forward and in a direction at right angles to its axis while the connection of the cover to the shoe tends to pull it along the direction of the arrow in Fig. 13 thereby causing the cover to be drawn taut so that the band of cement 110 which is applied to the cover by the applying roll 14 is spaced by a clean margin 112 from the corner 114 of the platform sole. Similarly the distance of the nozzle fingers 18 above the surface of the supporting roll 16, as indicated in Figs. 11 and 14, is such that a clean margin 116 is left below the band of cement 118 which is applied to the platform sole 10.

Figure 5:
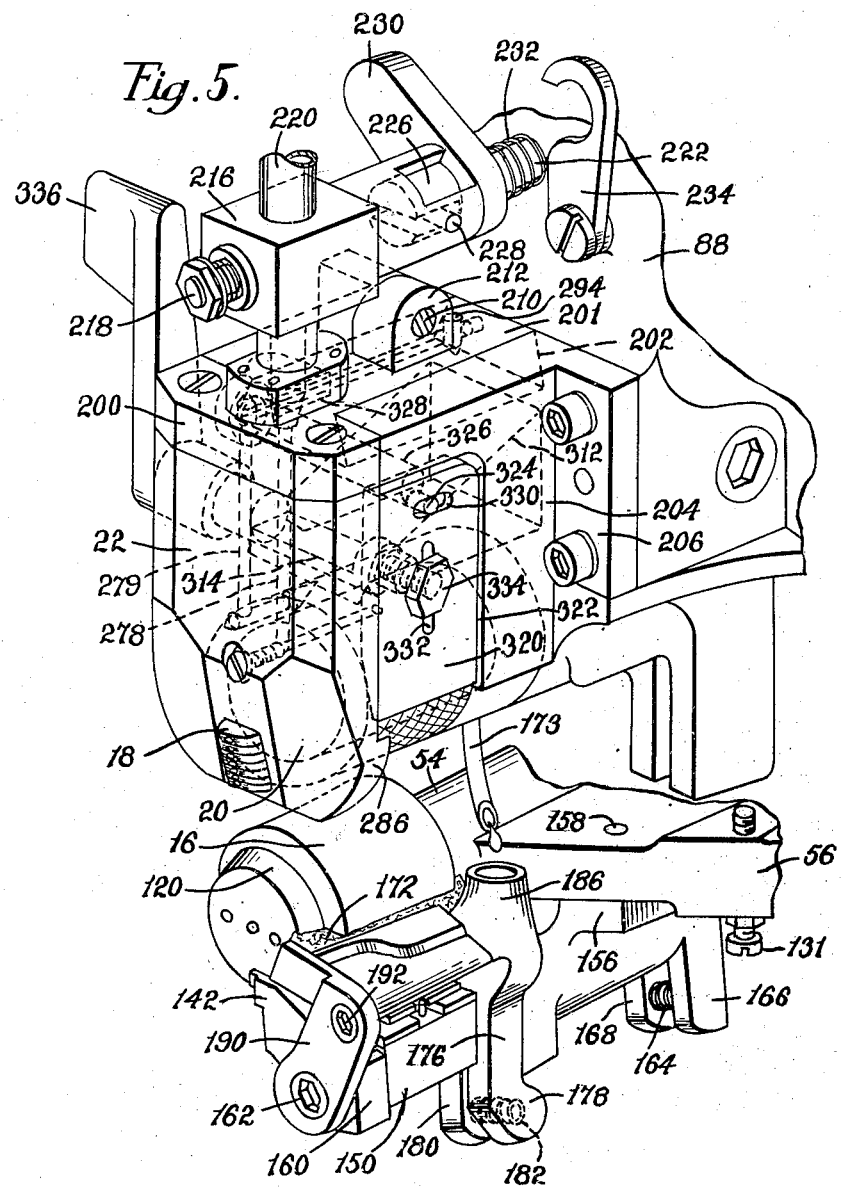
Fig. 5 is an angular view on an enlarged scale of the work-engaging parts.

In order to avoid interference between the portion of the cover which overlies the corner 114 of the platform sole 10 and the near corner of the supporting roll 16, the shaft 54 of the latter has been mounted (Fig. 4) at an angle to the shaft 52 which supports the applying roll and the end of the supporting roll 16 has been reduced and provided with a frusto-conical extension 120 against which the work may rest (Fig. 11) without scuffing the latter since it is always positioned in a plane which is substantially normal to the axis of the supporting roll. This may be seen from Fig. 14 where the corner of the roll 16 is cut back to form the extension 120. The bracket 56 which carries the shaft 54 is also provided with a bearing 122 for a short shaft 124 connected to the shaft 54 by means of miter gears 126. A drive chain 128 between the drive shaft 52 and the short shaft 124 is in the plane of the pivot screws 58 and permits tilting of the bracket 56 to allow work to be inserted between the supporting roll and the applying roll and then gripped between them as the treadle is depressed. The tilting downward of this bracket 56 is limited by a stop screw 130 carried in a bracket 132 attached to the bottom flange 84 of the hollow frame while the approach of the rolls is limited by a screw 131 (Figs. 1 and 5) carried in the bracket 56.

Inasmuch as the supporting roll 16 contacts with the outer surface of the platform cover it is necessary that it shall be kept clean so as not to smear cement upon the cover. Accordingly, provision has been made for clearing the cement from the peripheral and end faces of the supporting roll by means of scrapers 140 and 142 (Figs. 8 and 10). The scraper 140 is shaped to fit the periphery of the supporting roll 16 and is formed on the end of a plate 144 which is forked to surround the shaft of a clamping bolt 146, the head 147 of which is notched to engage a positioning pin 148. This bolt passes through and the pin is supported in a rectangular block 150 integral with a stud 152 which is tiltably mounted in a sleeve 154 forming part of a bracket 156 by means of which the scraper is attached to the work-supporting-roll bracket 56 and is held in position thereon by screws such as that shown at 158 in Fig. 1. The end scraper 142 is formed from a block 160 which is held on the end of the block 150 by means of a shouldered retaining screw 162. It is to be understood that the scraper 142 has surfaces coacting with the end and with the periphery of the frusto-conical portion 120 as well as with the adjacent shoulder on the body of the roll 16. These scrapers 140 and 142 are held in contact with the supporting roll by means of a spring 164 which is interposed between a lug 166 on the supporting bracket 154, 156 and a lug 168 having a collar portion 170 which is held on the stud 152 by means of a setscrew 171.

It has been found that, with certain kinds of cement, any thin layer which is not completely removed and which dries before it reaches the scrapers 140 and 142 becomes so hardened that the roll itself is scored by the action of the scrapers in trying to remove this layer. Accordingly, it is found desirable to also provide a felt wiper 172 engaging the surfaces of the supporting roll 16 at a point ahead of the scrapers and to continually supply this felt with a solvent delivered through a tube 173 from a sight-feed cup 175 (Fig. 1) so that any residual cement on the roll will be continually prevented from drying until it reaches the scrapers. The felt 172 is supported in a channel formed in a carrier 174 which has a depending arm 176 to swingably mount the carrier upon the stud 152 (Fig. 8). The arm is provided with a lug 178 between which and another lug 180 on the bracket 154 is a spring 182 acting to press the felt against the roll. A groove formed at the bottom of the channel in the carrier 174 communicates with a cup 184 (Fig. 10) formed in an enlargement 186 of the carrier 174 and positioned to receive solvent dripping from the end of the tube 173. A plate 188 attached to the carrier 174 provides additional support for the felt so that it will not be pushed out of the carrier by the action of the driven supporting roll 16. At the outer end of the carrier 174 a cover plate 190 is attached thereto by a screw 192 and has an apertured end portion swingably mounted on the head of the screw 162.

Figure 6:
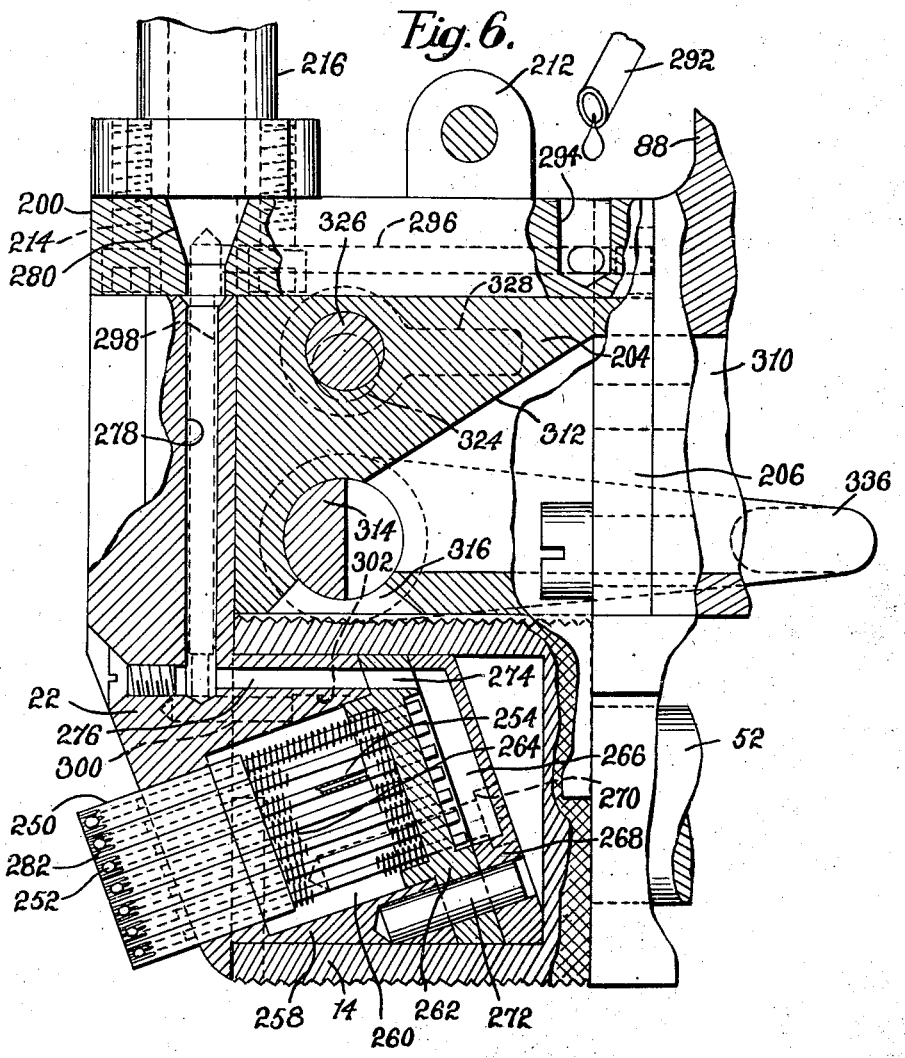
Fig. 6 is a vertical section on a still larger scale taken along the axis of the applying roll.

The carrier 22 for the nozzle 18 is supported on the end of a plate 200 (Fig. 5) which has a reduced portion or slide 201 received in a dovetail slot 202 in the upper end of a block 204 which is provided with side flanges 206 to enable it to be attached by means of screws to the end face of the double receptacle 88. The nozzle carrier and its plate are held in the dovetail 202 by means of a jam 208 (Fig. 1) in the lower end of a lever which is pivoted on a pin 210 (Fig. 5) carried by an upstanding lug 212 formed on the upper surface of the slide portion 201. The jam 208 bears frictionally upon the upper surface of the block 204 to lock the nozzle carrier in position. On the top of the plate 200 there is attached by screws 214 (Fig. 6) a fitting 216 containing a shut-off valve 218 which is interposed in a passage comprising a pipe fitting 220 joined to the flexible hose 100. The actuation of this shut-off valve 218 is effected by means of a shaft 222 passing through a sleeve 224 in the receptacle and having a forked end 226 (Fig. 5) adapted to engage a cross-pin 228 in the valve 218. At its right end the shaft 222 is provided with a lever 236 (Fig. 2) which is connected by a rod 238 to the lever 72 the other end of which is joined to the forked upper end of the treadle rod 78 by the pin 74. The arrangement is such that, after the bracket 56 has been tilted to raise the supporting roll 16 into engagement to grip the work against the under side of the applying roll 14, then the valve 218 is opened to permit the flow of cement under pressure to the nozzle 18.

Beside the forked end of the shaft 222 there is a short handle 230 (Fig. 5) and a spring 232 is provided between this handle and the side of the receptacles 88 to normally hold the forked end 226 in engagement with the pin 228. Between periods of use of the machine the nozzle carrier is removed in order to dip the nozzle in a solvent cup 229 (Fig. 3) and at that time the shaft 222 is held in retracted position by pushing the hand lever 230 inwardly toward the wall of the receptacle and turning a flat hook 234 down over the forked end 226 at the left of the handle 230.

Figure 7:
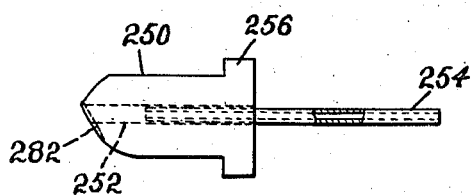
Fig. 7 is a view on the same scale of one of the nozzle fingers.

The nozzle 18 is made up of a series of flat delivery plates or fingers 250 (Figs 6 and 7), each of which is provided with a passage 252 communicating with a supply of cement, as will be later described, through a tube 254 connected thereto. The series of delivery plates 250 is mounted in and fills an aperture in the carrier 22 and each of the plates has shoulders 256 to limit the outward movement thereof. In order to provide space for the nozzle parts, the carrier 22 has a projection 258 which is received within the hollow roll 14. This projection has a recess 260 in which the tubes 254 are positioned and this recess is defined by a closure plate 262 between which and the delivery plates are springs 264 surrounding the individual tubes 254. The closure plate is perforated to permit a sliding movement of the tubes therein. The ends of these tubes open into an inner recess 266 formed partly in the closure plate 262 and partly in a cover 268 held on the projection 258 by means of screws 270. A dowel pin 272 facilitates the assembly of the closure plate 262 and the cover 268 on the projection 258.

Cement under pressure is then supplied to the inner recess 266 through a passage 274 in the closure plate and a series of passages 276, 278 and 280 in the carrier 22. The upper end of the passage 280 communicates with the valve fitting 216.

It will be noted that the work-engaging end of each of the plates 250 is provided with shallow grooves 282 between which the passage 252 opens. There is thus provided a series of separately movable delivery plates 250 each individually supplied with cement through its corresponding tube 254 with the result that the end of the nozzle can as readily accommodate itself to a curved surface 284 (Fig. 14), such as might be found on the bottom of the shank portion of the platform sole 10, as it can to a flat portion of said sole as shown in Fig. 11. The carrier 22 has an overlapping guard 286 which prevents the approaching work from contacting the outer lower corner of the applying roll 14.

Due to the impossibility of making the tubes 254 fit so tightly in the perforated closure plate 262 that there will never be any leakage of cement into the recess 260, it is found desirable to supply small amounts of solvent to that recess so as to assure free movement of the individual delivery plates 250 and of the springs 264 surrounding these tubes 264. Accordingly, another sight-feed cup 290 (Fig. 1) is provided with an open end tube 292 so that solvent may be delivered drop by drop to a cup 294, formed in the upper surface of the slide 201 and communicating through passages 296, 298 and 300 with a groove 302 which opens into the upper side of the recess 260.

The delivery of cement from the left-hand receptacle 94 to the upper side of the applying roll 14 is effected by means of an outlet opening 310 in the receptacle wall which communicates with a tapered passage 312 in the block 204 and in which there is inserted a shut-off valve 314. The lower end of this passage at 316 is enlarged from front to back to permit the cement to spread over the upper surface of the applying roll 14 while the quantity thereof is controlled by a scraper plate 320 (Fig. 5) mounted on the front side of the block 204. The lower end of this scraper plate is close to the periphery of the applying roll and the plate is received in a recess 322 (Fig. 5) in the front face of the block 204 in which it may be moved up and down by means of an eccentric pin 324 on the end of a cross-shaft 326 having on the rear side of the block a short handle 328. The eccentric pin 324 is received in a horizontal slot 330 in the scraper plate 320 and the latter is also provided with a vertical slot 332 receiving a headed screw 334 which is threaded into the end of the shut-off valve 314. On the far end of the shut-off valve is a handle 336 to permit it to be closed when leaving the machine for the night, for example.

In the use of the machine a shoe S having a platform sole 10 is held with that sole nearly upright and engaging the ends of the plates of the nozzle 18. The platform cover 12 is positioned between the applying roll 14 and the supporting roll 16 and the shoe is turned horizontally to bring the sole into engagement with the guide surface 20. The operator then depresses the treadle 80 to lift the supporting roll 16 and to open the shut-off valve 218 in the fitting leading to the nozzle. Then, assuming that the motor is in operation and turning the rolls 14 and 16, the cover will be fed positively forward and at the same time will be drawn inwardly to tension it so that the band of coating material 110 will be slightly spaced from the corner 114 of the sole as shown in Fig. 13. Similarly the nozzle will apply a coating upon the platform sole 10, leaving a clean margin 116, until the whole periphery of the sole, or such portion thereof as it is desired to coat, has been traversed. The treadle will then be released shutting the valve 218 in the nozzle supply and lowering the supporting roll 16, permitting the work to be removed.

Having thus described my invention, what I claim as new and desire to secure by Letters Patent of the United States is:

1. In a machine for simultaneously coating the margin of the bottom of a shoe and a projecting cover adapted to be lasted over the bottom of the shoe, rolls for gripping the cover material, means for supplying cement to one of said rolls to coat the inner surface of said material, rigid means for guiding the shoe at an acute angle to a plane normal to the axis of the roll thereby to set up a cross-feed which will stretch the cover material as it is coated.

2. In a machine for simultaneously coating the margin of the bottom of a shoe and a projecting cover adapted to be lasted over the bottom of the shoe, rolls for gripping the cover material, means for supplying cement to one of said rolls to coat the inner surface of said material, a nozzle for applying coating material simultaneously to the margin of the bottom of the shoe and a rigid abutment beside the nozzle for guiding the shoe at an acute angle to a plane normal to the axis of the roll thereby to set up a cross-feed which will stretch the cover material as it is coated, and a nozzle for applying coating material simultaneously to the margin of the bottom of the shoe.

3. In a machine for simultaneously coating the margin of the bottom of a shoe and a projecting flexible cover adapted to be lasted over the bottom of the shoe, an applying roll supported at one end of a driven shaft, a coacting roll for supporting the flexible cover material in contact with the applying roll, a shoe-bottom-guiding rest adjacent to the unsupported end of the applying roll, and means on said rest for coating the margin of the bottom of the shoe progressively as the flexible material is coated by said applying roll.

4. In a machine for simultaneously coating the margin of the bottom of a shoe and a projecting flexible cover adapted to be lasted over the bottom of the shoe, a cement-applying roll supported at one end of a driven shaft, a coacting work-supporting roll to press the flexible cover material against the applying roll, a shoe-bottom-guiding rest adjacent to the unsupported end of the applying roll, an extruding nozzle in said rest disposed in position to coat the margin of the shoe bottom, and means for supplying cement to said nozzle.

5. In a machine for simultaneously coating the margin of the bottom of a shoe and a projecting flexible cover adapted to be lasted over the bottom of the shoe, a cement-applying roll supported at one end of a driven shaft, a coacting work-supporting roll to hold the flexible cover material against the applying roll, a shoe-bottom-guiding rest on the machine adjacent to the unsupported end of the applying roll, a conformable nozzle in said rest for coating the margin of the bottom of the shoe, said nozzle being arranged to conform to the position and curvature of the latter, and means for supplying cement to said nozzle.

6. In a machine for simultaneously coating the margin of the bottom of a shoe and a projecting cover adapted to be lasted over the bottom of the shoe, a cement-applying roll supported at one end of a driven shaft, a coacting work-supporting roll, a shoe-bottom-guiding rest having a guiding surface at an acute angle to the end of the applying roll, a coating nozzle in said rest adjacent to said guiding surface and conformable to a shoe bottom, and means for supplying cement to said nozzle.

7. In a shoe part cementing machine, coacting rolls for gripping the margin of flexible material projecting from the bottom of a shoe and intended to be lasted over that bottom, said rolls being unsupported at their outer ends, means for driving at least one of said rolls, the outer end of one of said rolls being provided with a recess, an abutment at the end of that roll serving as a shoe-bottom rest and provided with a portion projecting into the recess of the roll, said abutment having a multi-finger nozzle built into the projecting portion of the abutment and arranged to coat part of the surface of the shoe bottom which engages the rest, and means for supplying cement through the projecting portion to the individual fingers of the nozzle.

8. In a machine for simultaneously coating the margin of the bottom of a shoe and a projecting cover adapted to be lasted over the bottom of the shoe, means for stretching and coating the cover, means for coating the margin of the shoe bottom comprising an apertured guide one face of which is engaged by the shoe bottom, a series of nozzle fingers positioned in said aperture and projecting from the guiding face, said fingers having passages therein, and means for supplying cement to the passages of said fingers.

9. In a machine for simultaneously coating the margin of the bottom of a shoe and a projecting cover adapted to be lasted over the bottom of the shoe, means for stretching the cover, means for coating the shoe bottom comprising a bottom guide having a recess, a series of nozzle fingers positioned in said recess and projecting out toward the shoe bottom, said fingers having passages and open end tubular extensions communicating with the passages, a closure for the recess provided with apertures for the open end tubular extensions, springs in the recess arranged to press the fingers against the work, means for supplying cement to the extensions, and means for supplying solvent to the recess.

10. In a shoe-part-coating machine, a flexible nozzle comprising a block having a recess, an opening in said block communicating with the recess, fingers movable in the opening having passages therethrough for the extrusion of coating material, springs within the recess to oppose inward movement of the fingers, means for supplying cement to the finger passages, and means for supplying a solvent for the coating material to the recess to facilitate the free movement of the fingers.

11. In a shoe-part-coating machine, a flexible nozzle comprising a recessed block provided with an opening communicating with the recess, hollow delivery fingers movably positioned in said opening to substantially fill it, a cover for the recess, tubes in the recess communicating with the fingers and passing through the cover, springs surrounding said tubes and interpositioned between the fingers and the cover, a chamber receiving the ends of the tubes, means for supplying cement to said chamber, and means for supplying a solvent for the cement to said recess.

12. In a shoe-part-coating machine, a recessed block having an opening, fingers laterally contacting one another, extending through and filling said opening, said fingers having passages, means for urging said fingers outwardly of the recess, means for limiting the outward movement thereof, and means for supplying coating material to the finger passages.

13. In a machine for simultaneously coating the margin of the bottom of a shoe and a projecting cover adapted to be lasted over the bottom of the shoe, an applying roll and a coacting work-supporting roll, a shoe-bottom-engaging means adjacent to the end of the applying roll for guiding the bottom of the shoe in a plane forming an acute angle with the axis of the applying roll, the axis of said supporting roll being also angularly related to the axis of the applying roll and substantially normal to the plane of the shoe-bottom-engaging means.

14. A machine as in claim 13 in which the supporting roll has a reduced portion at its outer end for supporting the work adjacent to the edge of the shoe bottom.

15. In a coating machine for a platform shoe having a flexible platform cover surrounding the periphery of a platform sole on the shoe, an applying roll for coating the platform cover, a shoe-bottom-engaging guide adjacent to the end of the applying roll for guiding the bottom of the shoe in a direction other than normal to the axis of the applying roll, and a supporting roll for holding the cover in engagement with the applying roll, the axis of said supporting roll being angularly related to the axis of the applying roll, the corner of said supporting roll being cut back to avoid scarring the work near the edge of the platform sole.

16. In a coating machine for a platform shoe having a flexible platform cover surrounding the periphery of a platform sole on the shoe, an applying roll and a coacting work-supporting roll having their axes in parallel horizontal planes, the axis of said supporting roll diverging from a vertical plane through the axis of the applying roll, the periphery of said supporting roll being hollowed to fit the coacting portion of the applying roll, means to supply coating material to the applying roll, and a shoe-bottom-engaging rest adjacent to the end of the applying roll for guiding the bottom of the shoe in a plane forming an acute angle with the axis of the applying roll.

17. In a coating machine for a platform shoe having a flexible platform cover surrounding the periphery of a platform sole on the shoe, an applying roll and a coacting work-supporting roll having their axes in parallel horizontal planes, the axis of said supporting roll diverging from a vertical plane through the axis of the applying roll, the periphery of said supporting roll being hollowed to fit the coacting portion of the applying roll, means to supply coating material to the applying roll, and a shoe-bottom-engaging rest adjacent to the end of the applying roll for guiding the bottom of the shoe in a plane substantially normal to the axis of the supporting roll.

WILBUR L. MacKENZIE.

REFERENCES CITED

The following references are of record in the file of this patent:

UNITED STATES PATENTS

| Number | Name | Date |
| --- | --- | --- |
| 2,352,656 | Phillips | July 4, 1944 |

Certificate of Correction

Patent No. 2,466,818 April 12, 1949

WILBUR L. MacKENZIE

It is hereby certified that errors appear in the above numbered patent requiring correction as follows:

In the grant, line 6, in the heading to the drawings, line 3, Sheets 1 to 8, inclusive, and in the heading to the printed specification, line 2, in the title of invention, for "SHOES" read *SOLES*; column 7, line 23, for "tubes 264" read *tubes 254*; column 8, line 19, after "coated" and before the period, insert , *and means for applying coating material simultaneously to the margin of the bottom of the shoe*; lines 31 to 33, strike out " , and a nozzle for applying coating material simultaneously to the margin of the bottom of the shoe";

and that the said Letters Patent should be read with these corrections therein that the same may conform to the record of the case in the Patent Office.

Signed and sealed this 10th day of January, A. D. 1950.

[SEAL]

THOMAS F. MURPHY,
*Assistant Commissioner of Patents.*